Dec. 22, 1942.    E. E. WILSON ET AL    2,305,946
INTERNAL COMBUSTION ENGINE
Filed Sept. 7, 1937    3 Sheets-Sheet 2
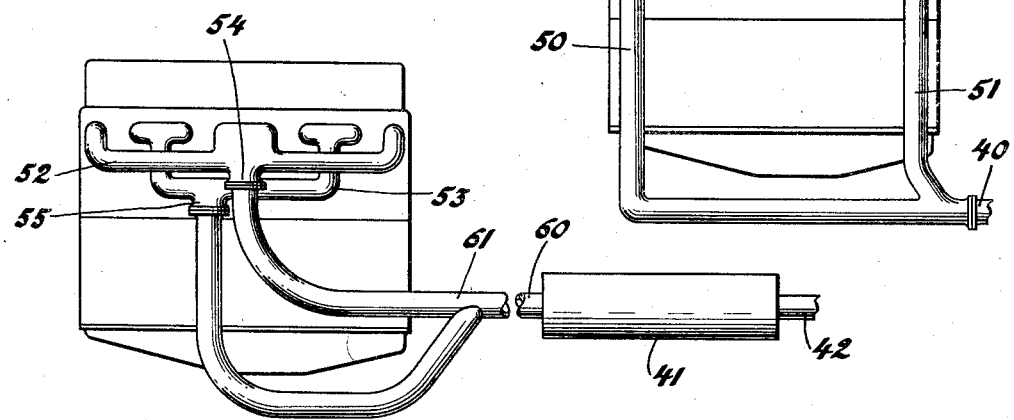
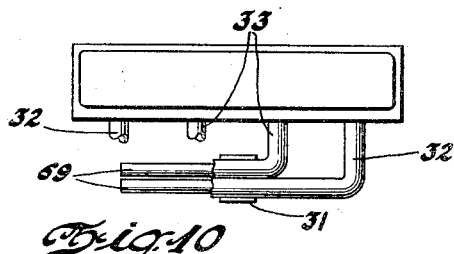
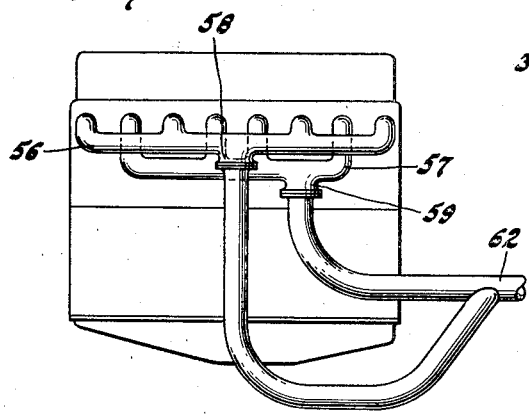
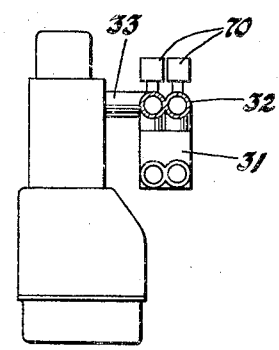
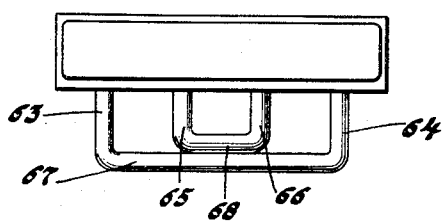
Inventors
Ernest E. Wilson
& John O. Almen
By Blackmore, Spencer & Flint
Attorneys Dec. 22, 1942.  E. E. WILSON ET AL  2,305,946
INTERNAL COMBUSTION ENGINE
Filed Sept. 7, 1937  3 Sheets-Sheet 3

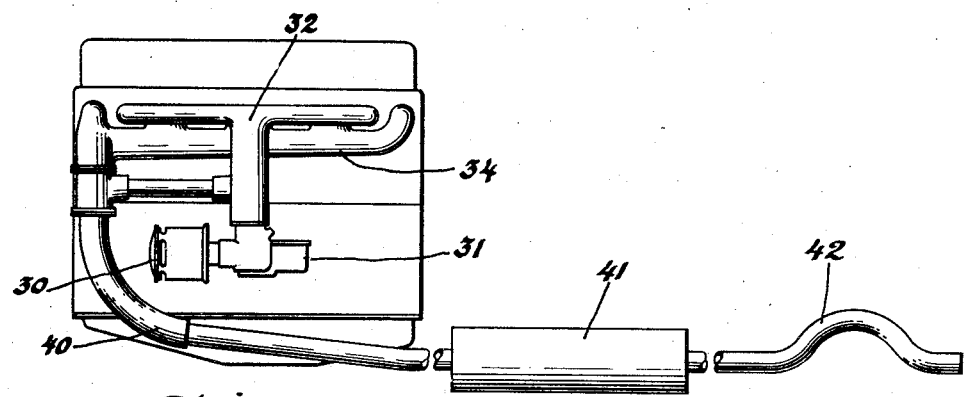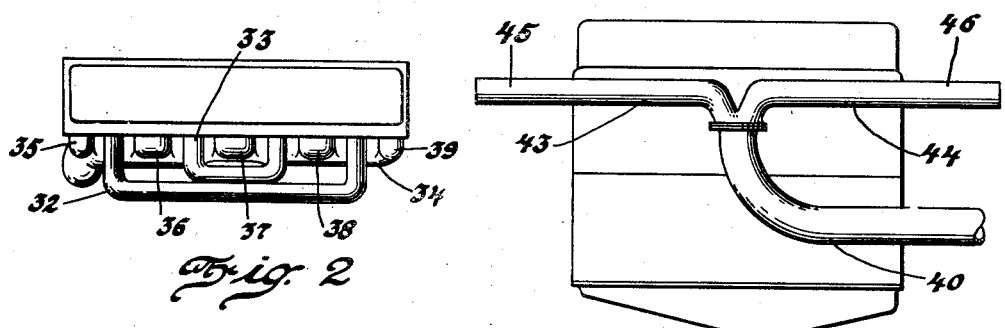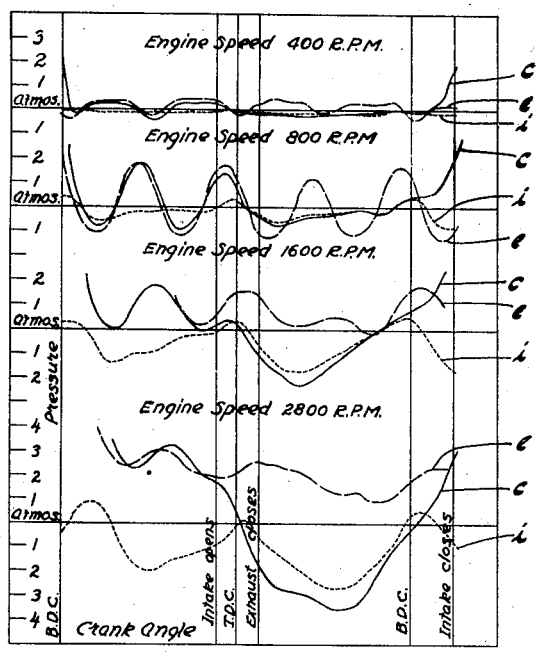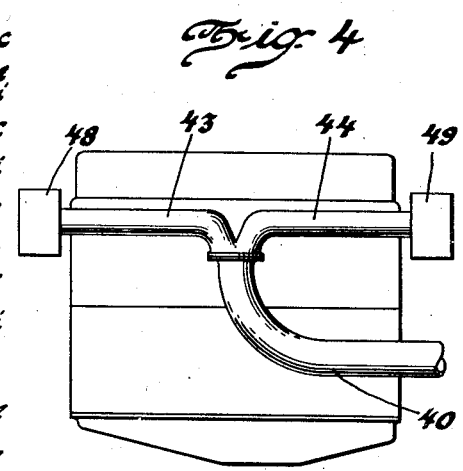

Inventors
Ernest E. Wilson
& John O. Almen
By Blackmore, Spersen & Flint
Attorneys Patented Dec. 22, 1942

2,305,946

UNITED STATES PATENT OFFICE 2,305,946

INTERNAL COMBUSTION ENGINE

Ernest E. Wilson, near Milford, and John O. Almen, Royal Oak, Mich., assignors to General Motors Corporation, Detroit, Mich., a corporation of Delaware Application September 7, 1937, Serial No. 162,690

4 Claims. (Cl. 123—52)

We have discovered that operating characteristics of an internal combustion engine, such as its noise producing characteristics, its rate of fuel consumption, its tendency to detonate, its power output and the temperature of its exhaust gases, are to a very considerable extent affected, not only by the resistance of its intake and exhaust systems to the flow of gases therethrough, but also by the acoustical characteristics of its intake and exhaust systems. By the term "acoustical characteristics" is meant the properties of the intake and exhaust systems with regard to their effect on the phase relations in which the pressure waves which occur therein while the engine is operating merge and to the creation of resonance of these pressure waves. We have also discovered that the acoustical characteristics of the intake and exhaust systems of an internal combustion engine may be altered and that when they are altered the operating characteristics of the engine are altered. And, upon the basis of these discoveries, we have devised a procedure by which defects in the acoustical characteristics of the intake and exhaust systems of an internal combustion engine may be detected and the alterations necessary to eliminate them and thereby favorably influence the operating characteristics of the engine determined. In this procedure and in the improvements in internal combustion engines which have resulted from its application resides the invention to which this application relates.

Although some features of this invention are applicable to single-cylinder internal combustion engines and to multi-cylinder internal combustion engines equipped with independent intake and/or exhaust systems for each cylinder, the invention has to do principally with multi-cylinder internal combustion engines equipped with intake and exhaust manifolds. To understand and appreciate our invention fully, some comprehension of the phenomena which occur in the intake and exhaust systems of multi-cylinder internal combustion engines equipped with intake and exhaust manifolds is necessary.

It is, of course, a matter of common knowledge that during the operation of an engine of the type near consideration, air or a mixture of fuel and air enters its cylinders through its intake manifold and burned gases are discharged from its cylinders into the atmosphere through its exhaust manifold. It is commonly known that because the air or the mixture of fuel and air enters and the burned gases are discharged from each cylinder, not continuously, but intermittently, the flow of the air or the mixture of fuel and air and the burned gases is, not smooth and steady, but pulsating. The effect of the intermittent introduction and discharge of air or a mixture of fuel and air and burned gases may be described differently by saying that it produces in the intake and exhaust systems pressure waves which travel at approximately the speed of sound. Each of the cylinders produces its own series of pressure waves and the pressure waves produced by one cylinder naturally affect the ingress of air or the mixture of fuel and air into and the exit of burned gases from the other cylinders.

The intake and exhaust systems of an internal combustion engine may be considered pipes of fixed length which are closed at the (engine) ends near which the pressure waves originate and are open at their opposite ends unless there are incorporated therein baffle mufflers in which event they are to be considered pipes closed at both ends. The intake and exhaust systems of internal combustion engines, consequently, have definite natural frequencies. In view of this and the facts that the intake and exhaust periods of the several cylinders occur at different instants and that the ports of the several cylinders are commonly at different distances from the atmosphere, the pressure waves produced by one cylinder may be reinforced either by resonance or by union, in phase, with pressure waves produced by another cylinder or cylinders or attenuated by union, out of phase, with pressure waves produced by another cylinder or cylinders. Modification, by attenuation or reinforcement, of the pressure waves produced by a cylinder will, of course, alter their effect on the ingress of air or a mixture of fuel and air into or the exit of burned gases from the other cylinder or cylinders. This alteration may affect the operating characteristics of the engine either favorably or unfavorably.

Generally speaking, resonance or a union of pressure waves in phase is a desirable condition in the intake system because it generally tends to increase the pressure therein when the intake ports are open and, consequently, the volume of combustible mixture or air which enters the cylinders of the engine and an undesirable condition in the exhaust system because it generally tends to increase the pressure therein when the exhaust ports are open and, consequently, to decrease the volume of combustible mixture or air which enters the cylinders by hindering the discharge of burned gases therefrom. Conversely, generally speaking, a union of pressure waves out of phase is an undesirable condition in the intake system and a desirable condition in the exhaust system.

The determination of the acoustical characteristics of the intake and exhaust systems of an internal combustion engine, the defects, if any, therein and the alterations necessary to eliminate the defects is preferably made by analysis of the variations in the pressures within a cylinder of the engine and within its intake and exhaust manifolds near the cylinder during the intake and exhaust periods of the cylinder. But an alternative method of determination of the mentioned characteristics, which is applicable to proposed as well as to existing systems and, consequently, eliminates much experimental work and testing, is available, viz., a study of the intake and exhaust timing of the cylinders of the engine in conjunction with the firing order of the cylinders and the structural characteristics of the systems.

How the intake and exhaust systems of an internal combustion engine may be altered to change their acoustical characteristics and what effects these changes have on the acoustical characteristics of the systems will be fully set forth in the following specification.

For a better understanding of the nature and objects of this invention, reference is made to the following specification and the accompanying drawings wherein the invention and its application to two internal combustion engines is described and illustrated.

In the accompanying drawings:

Figure 1 is a side elevation of an internal combustion engine equipped with complete intake and exhaust systems.

Figure 2 is a top plan view of the engine shown in Figure 1.

Figure 3 is a chart in which the variations in pressure within a cylinder and within the intake and exhaust manifolds of the engine shown in Figures 1 and 2 near the cylinder at four different engine speeds are graphically represented.

Figures 4, 5, 6, 7 and 8 show, in side elevation, the engine shown in Figures 1 and 2 equipped with modified exhaust systems.

Figures 9, 10 and 11 show in top plan, in top plan with parts broken away, and in end elevation with parts broken away and in section, respectively, the engine shown in Figures 1 and 2 equipped with modified intake systems.

Figure 12:
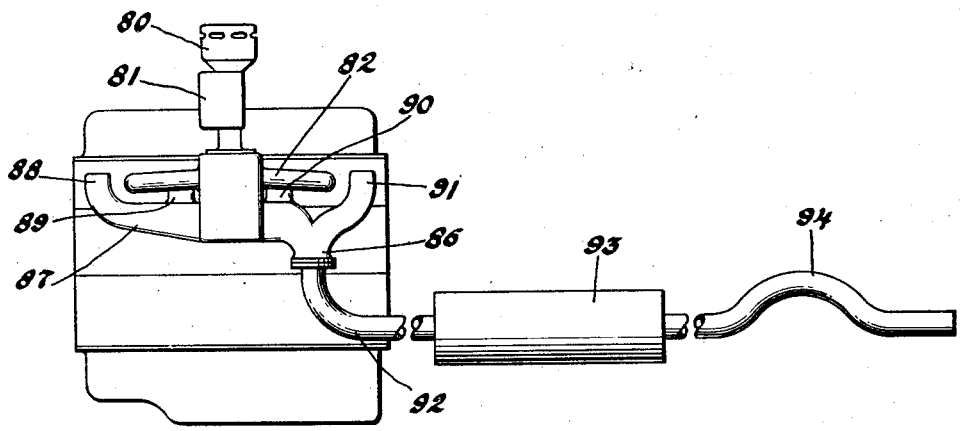
Figure 12 is a side elevation of another internal combustion engine equipped with complete intake and exhaust systems.

In the practice of our invention in connection with engines which are already equipped with complete intake and exhaust systems, the first step, in accordance with the preferred procedure, is to obtain data with respect to the pressure conditions within a cylinder and within the intake and exhaust manifolds of the engine near the cylinder at different positions of the crankshaft during the intake and exhaust periods of the engine while the engine is equipped with its complete intake and exhaust systems. In the cases of variable speed engines, the prescribed data should be taken while the engine is operating at several different speeds but, in the cases of constant speed engines, the data need be taken only while the engine is operating at the speed at which it is designed to operate. The prescribed data may be obtained by means of any suitable pressure recording gauge.

The next step, in accordance with the preferred procedure, consists in analyzing the data obtained during the first step to determine the acoustical characteristics of the intake and exhaust systems of the engine, the defects, if any, therein, what features of the systems produce these defects, and how the systems may be altered to eliminate the defects.

The third and final step, in accordance with the preferred procedure, is to alter the intake system and/or the exhaust system of the engine in the manner indicated by the analysis made during the second step.

To supplement the foregoing outline of our invention and to render the nature and application of the invention more readily comprehensible, we shall show how it has been applied to the two internal combustion engines shown in the drawings.

The first of the engines which are to be considered is shown in Figures 1 and 2. This engine, which is the propelling engine of a well known make of automotive vehicle, is a "straight-eight" of the four-stroke cycle type whose cylinders, numbered consecutively from front to rear of the engine, fire in the order 1, 6, 2, 5, 8, 3, 7, 4. Each of the cylinders of the engine is equipped with a poppet intake valve which opens 22° before top dead center and closes 44° after bottom dead center and with a poppet exhaust valve which opens 57° before bottom dead center and closes 29° after top dead center.

The intake system of the engine shown in Figures 1 and 2 consists of a combined air cleaner and silencer 30 of the resonator-absorber type, a "dual" updraft carburetor 31 and a manifold which consists of two runners 32 and 33 of which each is connected at its mid-point to one of the combustible mixture discharge orifices of the carburetor 31. The runner 32 is connected at one end to the intake ports of the first and second and at the other end to the intake ports of the seventh and eighth cylinders of the engine. The runner 33 is connected at one end to the intake ports of the third and fourth and at the other end to the intake ports of the fifth and sixth cylinders of the engine.

The exhaust system of the engine includes a manifold which consists of a single runner 34 with five branches 35, 36, 37, 38 and 39 which are connected, respectively, to the first, second and third, fourth and fifth, sixth and seventh, and eighth cylinders of the engine. To the end of the runner 34 opposite the branch 35, there is connected an exhaust pipe 40 to whose outer end there is connected a "through-type" resonator muffler 41. To the outer end of the muffler 41, there is connected a tail pipe 42.

The prescribed data with respect to the pressures within a cylinder and within the intake and exhaust manifolds of the engine shown in Figures 1 and 2 near the cylinder was taken while the engine was operating at several different speeds. Curves which represent the variations in pressure at the designated points in units of pounds per square inch above and below atmospheric pressure plotted against crank angle in terms of piston position while the engine was operating at speeds of 400, 800, 1600 and 2800 R. P. M. are reproduced in Figure 3. In this figure, the solid line curves represent the variations in the pressure within the cylinder, the dotted line curves the variations in the pressure within the intake manifold, and the dash line curves the variations in the pressure within the exhaust manifold.

An examination of the curves shown in Figure 3 discloses two noteworthy features. One is the regularity and large amplitude of the pressure variations in the exhaust manifold at the speed of 800 R. P. M. The other is the high value of the pressure within the cylinder at the beginning of the intake period and at top dead center on the exhaust stroke at this speed of the engine.

The first feature indicates that resonance of pressure waves occurs in the exhaust system at the speed of 800 R. P. M. and, consequently, that the engine does not have optimum operating characteristics at this speed. The existence of this condition, which was manifested in the engine under consideration by an increase in its noise producing characteristics and a loss of power at the speed of 800 R. P. M., might have been predicted from a consideration of its firing frequency and the effective length of its exhaust system.

The high value of the pressure within the cylinder at the beginning of the intake period and at top dead center on the exhaust stroke indicates that the cylinder is not completely rid of burned gases and, therefore, cannot be fully charged with combustible mixture and does not develop the maximum power of which it is capable at the speed of 800 R. P. M.

The speed at which resonance of pressure waves occurs in the exhaust system of an engine depends upon the firing frequency of the engine and the effective length of its exhaust system and may, consequently, be changed by altering the effective length of the exhaust system. Therefore, if resonance of pressure waves is particularly objectionable at the particular speed at which it occurs, it is possible to alter the exhaust system so as to eliminate the condition at this speed.

The effective length of the exhaust system of an internal combustion engine is approximately equal to the volume of its exhaust manifold divided by the cross-sectional area of its exhaust pipe, plus the distance from the junction of the manifold and the exhaust pipe to the outer end of the tail pipe if the engine is equipped with a "through type" muffler or to the first baffle in the muffler if the engine is equipped with a baffle muffler. Consequently, the effective length of the exhaust system of an internal combustion engine may be altered by changing the volume of its exhaust manifold or by actually increasing or decreasing the length of the piping included therein but it should be pointed out that a change in the length of the piping in an exhaust system in which a baffle muffler is included will alter the effective length of the exhaust system only if it is made on the engine side of the first baffle in the muffler.

While the volume of the exhaust manifold of an internal combustion engine may, of course, be changed by altering its transverse dimensions or the lengths of its branches, there are expedients by which the volume of the exhaust manifold may be increased and the effective length of the exhaust system thereby increased without altering either of these dimensions. Some of these expedients are illustrated in Figures 4, 5 and 6 of the drawings.

In Figure 4 there is shown the engine shown in Figures 1 and 2 equipped with a Y-type exhaust manifold. This manifold consists of two runners 43 and 44 which are joined one to the other and connected to the same exhaust pipe 40 at their inner ends. The runner 43 is connected to the first, second, third and fourth and the runner 44 to the fifth, sixth, seventh and eighth cylinders of the engine. The manifold shown in Figure 4 differs from conventional Y-type manifolds in that the runners 43 and 44 are extended beyond the front and rear exhaust ports of the engine, as indicated at 45 and 46, in order to increase the effective length of the exhaust system. The installation of a manifold of the type shown in Figure 4, of course, renders the exhaust system of the engine on which it is installed equivalent to a pipe closed at one end with the source of the pressure impulses (the engine) between its ends.

The extensions 45 and 46 of the exhaust manifold shown in Figure 4 may be replaced by chambers of larger cross-sectional area than the runners 43 and 44. The manifold shown in Figure 4 modified in the manner suggested in the next preceding sentence is shown in Figure 5 in which the reference characters 48 and 49 represent the chambers referred to. A merit of this installation is its economy of space.

The effective length of the exhaust system of the engine shown in Figures 1 and 2 may be increased by connecting the rear end of the runner 34 to the exhaust pipe 40 so as to produce what may be called a "loop manifold." The engine shown in Figures 1 and 2 equipped with such a loop manifold is shown in Figure 6. This manifold consists of a runner 47 which is connected to the exhaust ports of all of the cylinders of the engine and outlet ducts 50 and 51, of which the former is longer than the latter. The inner ends of the outlet ducts 50 and 51 are connected, respectively, to the front and rear ends of the runner 47 and the outer ends thereof are joined one to the other and connected to the same exhaust pipe 40.

By any of the expedients which have been suggested, the effective length of the exhaust system of an internal combustion engine may be altered so as to eliminate resonance of pressure waves at any given engine speed or at all speeds at which the engine is designed to operate or as to create resonance of pressure waves at any desired engine speed. Elimination of resonance of pressure waves at all engine speeds may also, in effect be accomplished by so tuning the "tuning pipes" which the extensions 45 and 46 of the runners of the manifold shown in Figure 4 constitute or the "bottle-type resonators" which the chambers 48 and 49 and the extensions of the runners of the manifold shown in Figure 5 to which they are connected constitute that their natural frequencies are equal to the natural frequency of the exhaust system because, when the tuning pipes or the resonators are so tuned, they will attenuate by resonance the pressure waves which are subject to reinforcement by resonance.

It is quite clear that the high value of the pressure within the cylinder of the engine shown in Figures 1 and 2 at the beginning of the intake period and at top dead center on the exhaust stroke is not attributable to any action of the cylinder under consideration. Our experiments have shown that this high pressure condition is attributable to the arrival at the exhaust port of the cylinder under consideration near the end of its exhaust period of the peak of a pressure impulse from another cylinder which impedes the discharge of burned gases from the cylinder under consideration. Consideration of the timing and the firing frequency of the engine renders it quite clear that the troublesome pressure impulse is produced by the cylinder which fires second (180°) after that under consideration.

The foregoing explanation of the cause of the undesirable pressure condition within the cylinder under consideration renders it clear that its existence might have been predicted from a consideration of the factors which determine the interval in the cycle of operation of one cylinder at which pressure impulses from the other cylinders reach its exhaust ports, viz., the firing order, the firing frequency and the timing of the engine and the distance which pressure impulses from one cylinder must travel to reach the exhaust ports of the others. Generally, as we have intimated above, except in connection with large engines, the first and last mentioned factors need not be considered in determining whether and, if so, at what engine speed the undesirable pressure condition under consideration will occur.

From what has been said, it is quite apparent that, if the peak of the pressure impulse from the cylinder which fires 180° after that under consideration did not arrive at the exhaust port of the latter near the end of its exhaust period, the pressure within the latter at the beginning of its intake period and at top dead center on its exhaust stroke would be reduced and, consequently, that the operation of the engine at the speed of 800 R. P. M. would be improved. Consideration of the fact that the pressure impulse travels at a definite rate of speed shows that, by changing the distance which the pressure impulse must travel to reach the exhaust port of the cylinder under consideration, it is possible to prevent its peak arriving at the exhaust port of the cylinder under consideration near the end of its exhaust period. Of course, this can be done by simply changing the length of the runner of the exhaust manifold between the cylinder under consideration and the cylinder which fires 180° after it but we consider it preferable to do it by subdividing the manifold so that no two cylinders which fire 180° apart exhaust into the same runner.

In Figures 7 and 8, there are shown exhaust manifolds for the engine shown in Figures 1 and 2 subdivided as suggested above.

The exhaust manifold shown in Figure 7 consists of two runners 52 and 53 on which there are formed outlet nozzles 54 and 55. The runner 52 is connected to the exhaust ports of the first, fourth, fifth and eighth and the runner 53 to the exhaust ports of the second, third, sixth and seventh cylinders of the engine.

The exhaust manifold shown in Figure 8 consists of two runners 56 and 57 on which there are formed outlet nozzles 58 and 59. The runner 56 is connected to the exhaust ports of the first, third, sixth and eighth and the runner 57 to the exhaust ports of the second, fourth, fifth and seventh cylinders of the engine.

The nozzles 54 and 55 of the exhaust manifold shown in Figure 7 and the nozzles 58 and 59 of the exhaust manifold shown in Figure 8 may be connected to separate exhaust pipes and therethrough to separate mufflers and tail pipes. Or, as the drawings indicate, the nozzles 54 and 55 may be connected to the same exhaust pipe 60, muffler 41 and tail pipe 42 by a Y 61 and the nozzles 58 and 59 may be connected to the same exhaust pipe, muffler and tail pipe by a Y 62. However, if the two nozzles of a manifold, such as those shown in Figures 7 and 8, are connected to the same exhaust pipe, muffler and tail pipe, as shown in the drawings, it is possible that the pressure impulses from a cylinder which exhausts into one runner may, at the junction of the branches of the Y, unite in phase with and reinforce the pressure impulses from a cylinder which exhausts into the other runner and/or may, by traveling through the branches of the Y, reach the exhaust port of a cylinder which exhausts into the other runner at such an interval in the cycle of its operation that it impedes the discharge of burned gases therefrom. But since the pressure impulses travel at a definite rate of speed, it is possible to eliminate both of these contingencies, throughout a considerable range of speed of operation of the engine, if not throughout the entire range of speed thereof, by making one branch of the Y of greater length than the other, as shown in the drawings, and properly dimensioning the total length of the branches. And, furthermore, by an extension of the former expedient, viz., by making the difference between the lengths of the branches of the Y such that the pressure impulses from the cylinders which exhaust into one runner of the manifold reach the junction of the branches of the Y 180° out of phase with the pressure impulses from the cylinders which exhaust into the other runner at any selected speed of the engine, it is possible to cause the pressure impulses to attenuate each other very considerably, not only at the selected speed, but also throughout a considerable range of speeds which extends above and below the selected speed.

Since pressure impulses from all of the cylinders of the engine shown in Figure 6 travel through both of the outlet ducts 50 and 51 to the junction thereof, there is the same possibility that pressure waves will be reinforced and that pressure waves from one cylinder will impede the discharge of burned gases from another cylinder in the manifold shown in Figure 6 as in the exhaust systems shown in Figures 7 and 8. However, both of these contingencies may be eliminated in the manifold shown in Figure 6 by use of the expedients discussed in connection with the exhaust systems shown in Figures 7 and 8, viz., by making the outlet ducts 50 and 51 of the proper absolute and relative lengths. It will, therefore, be understood that the total length of the outlet ducts 50 and 51 shown in Figure 6 is such that the latter contingency is eliminated and that the difference in the lengths of these ducts which has been mentioned is such that the former contingency is eliminated.

Instead of an exhaust manifold which consists of two runners, such as those shown in Figures 7 and 8, the engine shown in Figures 1 and 2 may be equipped with an exhaust manifold which consists of four runners of which each is connected to the exhaust ports of two cylinders or with a separate exhaust flue for each cylinder. Each of these runners or exhaust flues may be connected to a separate exhaust pipe, muffler and tail pipe. Or, alternatively, the several runners or exhaust flues may be connected to the same exhaust pipe, muffler and tail pipe by ducts of such absolute and relative lengths that the contingencies mentioned during the discussion of the manifolds shown in Figures 7 and 8 will be eliminated.

A change in the volume of the exhaust manifold which has been mentioned as an expedient by which the effective length of the exhaust system of an internal combustion engine may be altered affects also the amplitude of the pressure waves in the system but not the interval in the cycle of operation of one cylinder at which the peaks and valleys of pressure waves from the other cylinders reach its exhaust port if the transverse dimensions only of the manifold are altered. It is, therefore, possible to reduce the high value of the pressure within the cylinder of the engine under consideration at the beginning of its intake period and at top dead center on its exhaust stroke at the speed of 800 R. P. M. without changing the interval in its cycle of operation at which the peak of the pressure wave from the cylinder which fires second after it arrives at its exhaust port by increasing the volume of its exhaust manifold by increasing its transverse dimensions only.

An examination of the curves shown in Figure 3 will also reveal the defects in the intake system of the engine shown in Figures 1 and 2 and indicate how it should be altered to eliminate them.

In deducing from the curves the defects in the intake system and the remedies therefor, the principles employed in connection with the exhaust system are applicable. However, certain essential differences between the intake and exhaust systems of an internal combustion engine must be taken into account in applying these principles. Particularly, it must be remembered that high pressure in the intake manifold at the intake port of the cylinder of an engine, particularly near the end of its intake period, is an aid to the introduction of a full charge of combustible mixture into the cylinder and is, consequently, a desirable condition. Therefore, a union of pressure waves in phase, the arrival of a peak of a pressure wave at the port of a cylinder near the end of its intake period and resonance of pressure waves are generally to be sought rather than avoided in the intake system of an internal combustion engine. But generally it is not advisible to employ the expedient of decreasing the transverse dimensions of the intake manifold, particularly the portion of it near the intake ports, to produce the desirable condition referred to.

How the intake system of an internal combustion engine may be altered to effect the union of pressure waves in phase and/or to insure the arrival of a pressure impulse at the port of a cylinder near the end of its intake period may, we think, be deduced from the foregoing discussion of these phenomena.

To obtain resonance of pressure waves in the intake system of an internal combustion engine, it is generally necessary to increase the effective length of the system. And it may here be pointed out that if the effective length of the intake system is increased sufficiently resonance of pressure waves will occur at two speeds of the engine—at the lower speed because the frequency of the pressure impulses produced by the engine equals that of the fundamental and at the higher speed because the frequency of these pressure impulses equals that of a harmonic of the system. Any of the expedients hereinbefore suggested in connection with the exhaust system of the engine shown in Figures 1 and 2 may be employed to alter the effective length of the intake system of an internal combustion engine but they should be applied with care in order to avoid unfavorably affecting distribution of combustible mixture to the several cylinders of the engine.

Some expedients by which the effective length of the intake system of the engine shown in Figures 1 and 2 may be lengthened are illustrated in Figures 9, 10 and 11 of the drawings.

The expedient which is illustrated in Figure 9 resides in increasing the lengths of the branches 63 and 64 and 65 and 66 which connect the runners 67 and 68 of the manifold to the intake ports of the cylinders of the engine.

The expedient, which is illustrated in Figure 10 which is more practicable than that illustrated in Figure 9 because it is less likely to introduce fuel distribution difficulties into the intake system of the engine, resides in connecting a tube, which may be made adjustable in length, to the or each of the air intake orifices of the carburetor. To increase the effective length of a dual intake system, such as that with which the engine shown in Figures 1 and 2 is equipped by the expedient under consideration, a separate tube should be connected to each of the air intake orifices of the carburetor because the effective length of the sections of a dual intake system, considered as pipes, terminates at the junction, if any, of the sections. The engine shown in Figures 1 and 2, with its intake system modified as suggested above, is shown in Figure 10. In this figure, the reference characters 32 and 33 indicate the two sections of the intake manifold, the reference character 31 the carburetor and the reference characters 69 separate tubes of which each is connected to one of the air intake orifices of the carburetor. An air cleaner, a silencer or a combined air cleaner and silencer may be connected to the outer end of each of the tubes 69. Or a single air cleaner, silencer or combined air cleaner and silencer may be connected to the outer ends of the tubes 69 by a Y. But, in the latter event, neither the air cleaner, silencer or combined air cleaner and silencer nor the Y can be considered in determining the effective length of the intake system.

The expedient which is illustrated in Figure 11 resides in connecting a "bottle-type" resonator 70, which may be tuned or untuned, to each of the runners 32 and 33 of the intake manifold of the engine shown in Figures 1 and 2.

Figure 13:
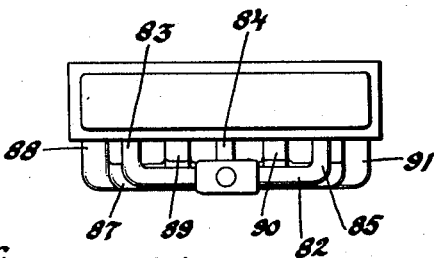
Figure 13 is a top plan view of the engine shown in Figure 12.

The second of the engines which are to be considered is shown in Figures 12 and 13 of the drawings. This engine which is the propelling engine of another well known make of automobile is a "straight-six" of the four stroke cycle type whose cylinders, numbered consecutively from front to rear of the engine, fire in the order 1, 5, 3, 6, 2, 4. Each of the cylinders of the engine is equipped with a poppet intake valve which opens 48° before top dead center and closes 83° after bottom dead center and with a poppet exhaust valve which opens 85° and closes 62° after top dead center.

The intake system of the engine shown in Figures 12 and 13 consists of a combined air cleaner and silencer 80 of the resonator-absorber type, a "single" downdraft carburetor 81 and a manifold which consists of a single runner 82 connected by branches 83, 84 and 85 to the intake ports of the first and second, the third and fourth, and the fifth and sixth cylinders of the engine, respectively. The exhaust system of the engine includes a manifold 87 whose branches 88, 89, 90 and 91 are connected, respectively, to the exhaust ports of the first, the second and third, the fourth and fifth, and the sixth cylinders of the engine. To the outlet nozzle 86 of the exhaust manifold 87, there is connected an exhaust pipe 92 to whose outer end there is connected a muffler 93 which, for the purpose at hand, is to be considered of the baffle type. To the outer end of the muffler 93, there is connected a tail pipe 94.

The prescribed data with respect to the pressures within a cylinder and within the intake and exhaust manifolds of the engine shown in Figures 12 and 13 near the cylinder was taken while the engine was operating at several different speeds. Curves, plotted and designated similarly to those in Figure 3, which represent the variations in pressure in the engine at the designated points while the engine was operating at speeds of 400, 800, 1200 and 2000 R. P. M. are reproduced in Figure 14.

Figure 14:
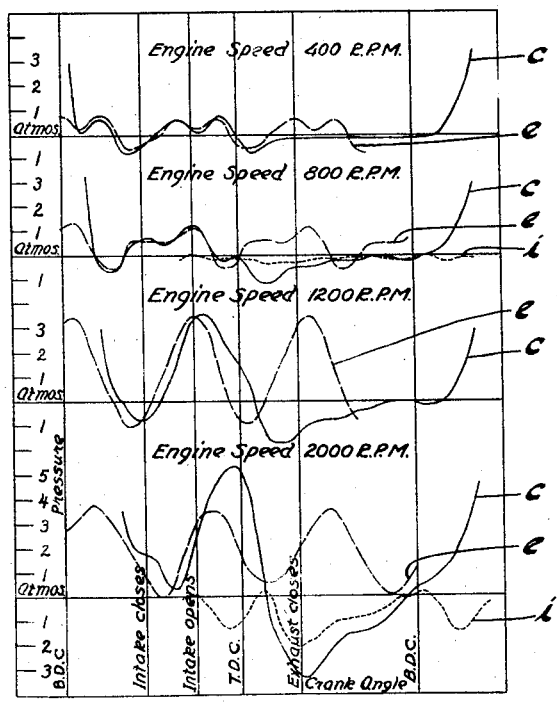
Figure 14 is a chart, similar to that shown in Figure 3, with respect to the engine shown in Figures 12 and 13.

An examination of the curves shown in Figure 14 discloses two noteworthy features. One is the regularity and large amplitude of the pressure variations in the exhaust manifold at the engine speed of 1200 R. P. M. The other is the high value of the pressure in the cylinder at the beginning of the intake period and at top dead center on the exhaust stroke when the engine is operating at speeds above 800 R. P. M.

The significance of the features to which attention has been called will be understood from what was said during the discussion of the engine shown in Figures 1 and 2. The resonance of pressure waves which occurs in the exhaust system at the engine speed of 1200 R. M. can, of course, be eliminated by changing the effective length of the exhaust system by any of the expedients suggested during the discussion of the engine shown in Figures 1 and 2.

It is apparent from a consideration of the timing and firing frequency of the engine shown in Figures 12 and 13 that the high value of the pressure in the cylinder at the beginning of the intake period and at top dead center on the exhaust stroke is attributable to a pressure impulse from the cylinder which fires immediately (120°) after the cylinder under consideration. This undesirable pressure condition may be eliminated by any of the expedients suggested during the discussion of the engine shown in Figures 1 and 2. An exhaust manifold for the engine shown in Figures 12 and 13 which will accomplish the desired result is shown in Figure 15.

Figure 15:
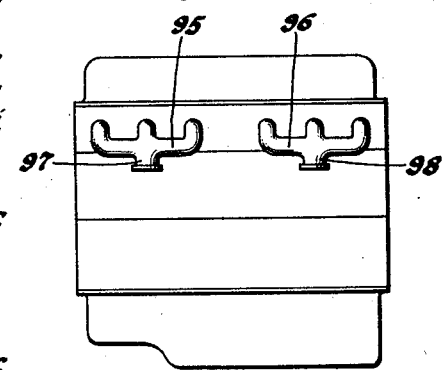
Figure 15 shows, in side elevation, the engine shown in Figures 12 and 13 equipped with a modified exhaust manifold.

The exhaust manifold shown in Figure 15 consists of two runners 95 and 96 on which there are provided outlet nozzles 97 and 98. The runner 95 is connected to the exhaust ports of the first, second and third and the runner 96 to the exhaust ports of the fourth, fifth and sixth cylinders of the engine. The outlet nozzles 97 and 98 may be connected to separate exhaust pipes, mufflers and tail pipes or may be connected to the same exhaust pipe, muffler and tail pipe by a Y in the manner disclosed during the discussion of the exhaust systems shown in Figures 6, 7 and 8.

Since when two cylinders whose intake periods overlap are connected to the same intake manifold, one reduces the pressure available to introduce combustible mixture into the other, it is apparent from a consideration of the timing and firing frequency of the engine shown in Figures 12 and 13 that its operating characteristics could be improved by providing it with a "multiple" intake system, i. e., by providing intake systems for the successively firing cylinders which are entirely separate or are separate except in that only a single carburetor is incorporated therein. And it will, of course, be understood that any of the expedients referred to during the discussion of the engine shown in Figures 1 and 2 may be employed to alter the effective length of and create resonance and/or to insure union, in phase, of pressure waves in the intake system of the engine shown in Figures 12 and 13 and/or to regulate the interval in the cycle of operation of one cylinder at which pressure impulses from other cylinders reach into intake ports.

Although the experimental method of determining whether or not and, if so, at what speed of the engine resonance of pressure waves occurs in the exhaust or the intake system of an internal combustion engine and at what interval in the cycle of operation of a cylinder pressure impulses from another cylinder or cylinders arrive at its ports has been emphasized it is, of course, within the scope of and a feature of this invention to determine these facts by analysis of the factors upon which they depend without experimentation. And although we have referred to the determination of pressure conditions within and near a single cylinder only of an engine it will, of course, be understood that if the design of the engine under consideration is such that the pressure conditions in and near one cylinder are different from those in and near another cylinder or cylinders, it may be necessary to determine pressure conditions in and near a number of cylinders in order to determine the acoustical characteristics of the engine, the defects therein and how the defects may be eliminated. Also, although specifically it does not constitute a feature of the invention with which this application is concerned, it may be pointed out that the interval in the cycle of operation of a cylinder of an engine at which pressure impulses from another cylinder or cylinders of the engine reach its ports may be altered by altering the timing of the engine or the flow characteristics of its ports.

We claim:

1. In a multi-cylinder four-stroke cycle internal combustion engine whose cylinders fire at 90° intervals, an exhaust system which includes a plurality of ducts of which each is connected to a plurality of cylinders of which no pair fire at intervals of 180°.

2. In an eight cylinder four-stroke cycle internal combustion engine whose cylinders fire at 90° intervals in the order 1, 6, 2, 5, 8, 3, 7, 4, an exhaust system which includes a duct which is connected to the first, fourth, fifth and eighth cylinders and a separate duct which is connected to the second, third, sixth and seventh cylinders.

3. In an eight cylinder four-stroke cycle internal combustion engine whose cylinders fire at 90° intervals in the order 1, 6, 2, 5, 8, 3, 7, 4, an exhaust system which includes a duct which is connected to the first, third, sixth and eighth cylinders and a separate duct which is connected to the second, fourth, fifth and seventh cylinders.

4. In a multi-cylinder internal combustion engine, a bifurcated duct of which one branch is connected to the exhaust ports of certain and the other branch to the exhaust ports of the same cylinders of the engine, the branches being of such total length that when the engine is operating at a selected speed pressure impulses from one of the cylinders travel through the branches of the duct and reach the exhaust port of another cylinder at such an interval in its cycle of operation that they do not materially obstruct the discharge of burned gases from it.

ERNEST E. WILSON.
JOHN O. ALMEN.